(12) United States Patent  
Fletcher et al.

(10) Patent No.: US 9,391,998 B2  
(45) Date of Patent: Jul. 12, 2016

(54) EXTENDED OAUTH ARCHITECTURE SUPPORTING MULTIPLE TYPES OF CONSENT BASED ON MULTIPLE SCOPES AND CONTEXTUAL INFORMATION

(71) Applicant: Verizon Patent and Licensing Inc., Basking Ridge, NJ (US)

(72) Inventors: Hugh Herrick Fletcher, Mountain View, CA (US); Piyush Jethwa, San Ramon, CA (US); Vijaykumar Cherukumudi, Overland Park, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 13/682,804

(22) Filed: Nov. 21, 2012

(65) Prior Publication Data

US 2014/0143837 A1    May 22, 2014

(51) Int. Cl.  
*H04L 29/06* (2006.01)

(52) U.S. Cl.  
CPC .................................. *H04L 63/105* (2013.01)

(58) Field of Classification Search  
USPC ............................................................ 726/4  
See application file for complete search history.

(56) References Cited

U.S. PATENT DOCUMENTS

| | | | | |
|---|---|---|---|---|
| 8,473,749 B1* | 6/2013 | Madsen | ................. | H04L 67/34 713/187 |
| 8,613,055 B1* | 12/2013 | Tomilson | ................ | G06F 21/00 713/182 |
| 2003/0028621 A1* | 2/2003 | Furlong | .................. | H04L 29/06 709/219 |
| 2006/0085443 A1* | 4/2006 | Pae et al. | ....................... | 707/100 |
| 2008/0242299 A1* | 10/2008 | Edwards et al. | ........... | 455/435.2 |
| 2009/0003569 A1* | 1/2009 | Forbes | .................. | H04M 15/06 379/142.07 |
| 2011/0276903 A1* | 11/2011 | Mehin | ..................... | H04L 51/26 715/758 |
| 2012/0144202 A1* | 6/2012 | Counterman | ......... | G06F 21/335 713/176 |
| 2012/0204233 A1* | 8/2012 | Rubio | ..................... | H04L 67/16 726/4 |
| 2013/0019002 A1* | 1/2013 | Heileman | ............... | G06F 21/10 709/223 |
| 2014/0033279 A1* | 1/2014 | Nimashakavi | ...... | H04L 63/0807 726/4 |
| 2014/0033280 A1* | 1/2014 | Nimashakavi | ...... | H04L 63/0807 726/4 |
| 2014/0143837 A1* | 5/2014 | Fletcher | ................ | H04L 63/105 726/4 |

* cited by examiner

*Primary Examiner* — Harris C Wang

(57) ABSTRACT

Method, device, and storage medium to receive a request to authorize a release of protected resource data, wherein the request includes a device identifier that identifies a requesting device of the request and one or more indicators that indicate one or more instances of the protected resource data being requested; identify a sensitivity level for each indicator of the protected resource data; identify, based on the device identifier, contextual information that indicates a preferred type of consent of the requesting device in response to a determination that at least one of the one or more indicators require consent from a resource owner of the protected resource data; select a type of consent based on the contextual information and the one or more sensitivity levels; and transmit a request, to a user device associated with the resource owner, for consent from the resource owner according to the type of consent.

20 Claims, 8 Drawing Sheets

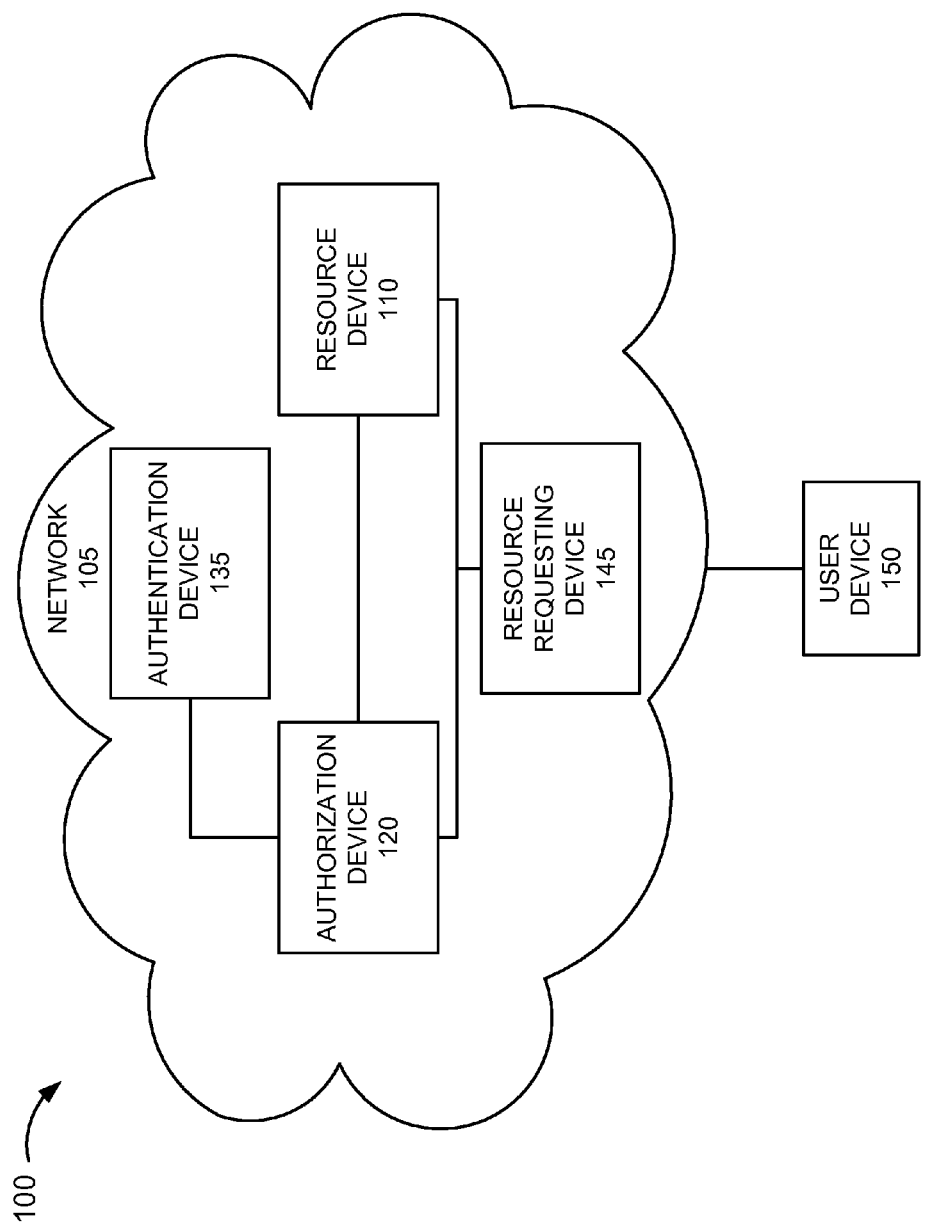

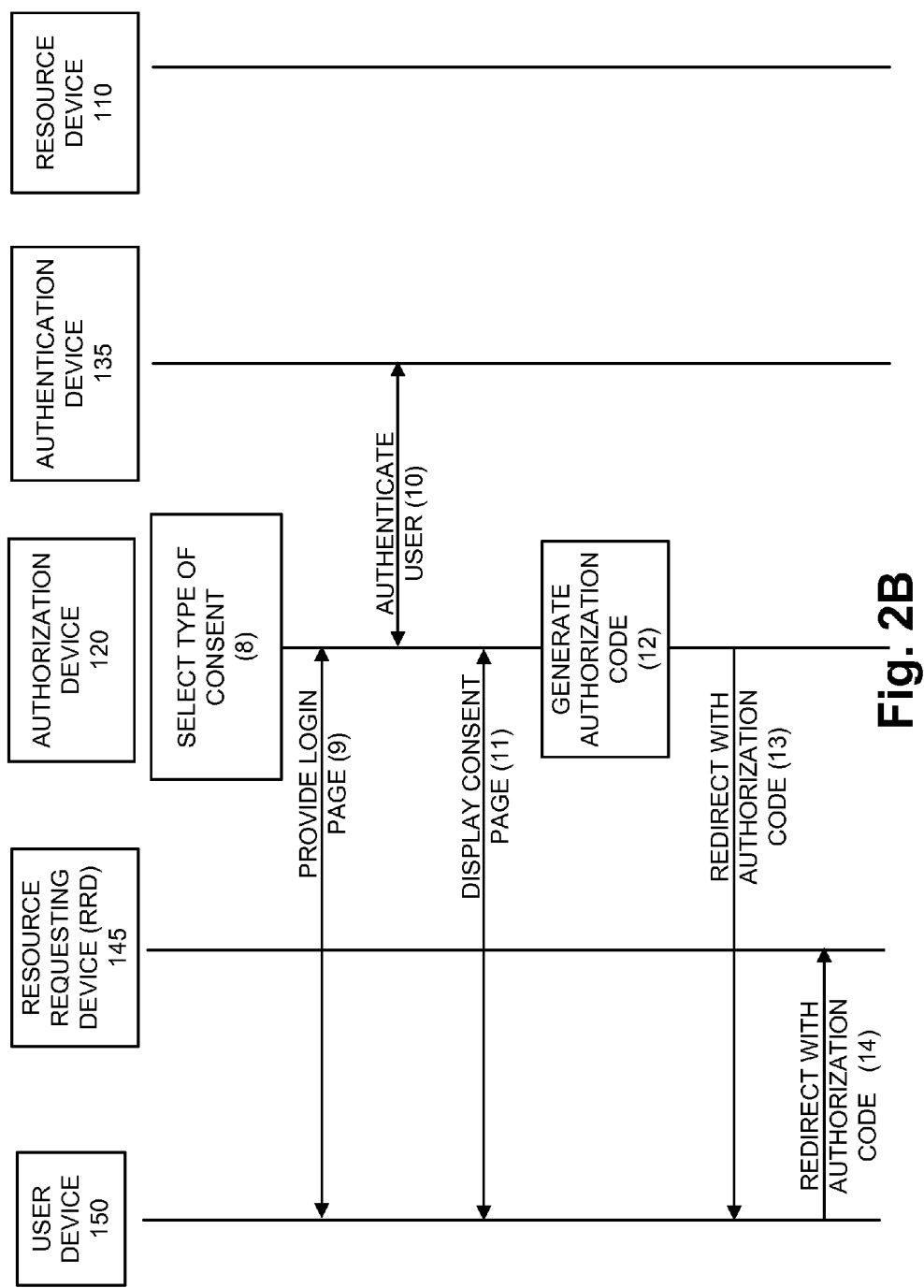

EXTENDED OAUTH ARCHITECTURE SUPPORTING MULTIPLE TYPES OF CONSENT BASED ON MULTIPLE SCOPES AND CONTEXTUAL INFORMATION

BACKGROUND

The OAuth 2.0 specification defines a framework that enables a third party application to obtain limited access to a Hypertext Transfer Protocol (HTTP) service, either on behalf of a resource owner by coordinating an approval interaction between the resource owner and the HTTP service, or by allowing the third party application to obtain access on its own behalf.

DESCRIPTION OF THE DRAWINGS

FIG. 1 is a diagram illustrating an exemplary environment in which an exemplary embodiment of an extended OAuth service may be implemented;

FIGS. 2A-2C are diagrams illustrating an exemplary process of an extended OAuth service based on an exemplary scenario in which a requested scope includes public and private resource data;

DETAILED DESCRIPTION

Figure 2A:
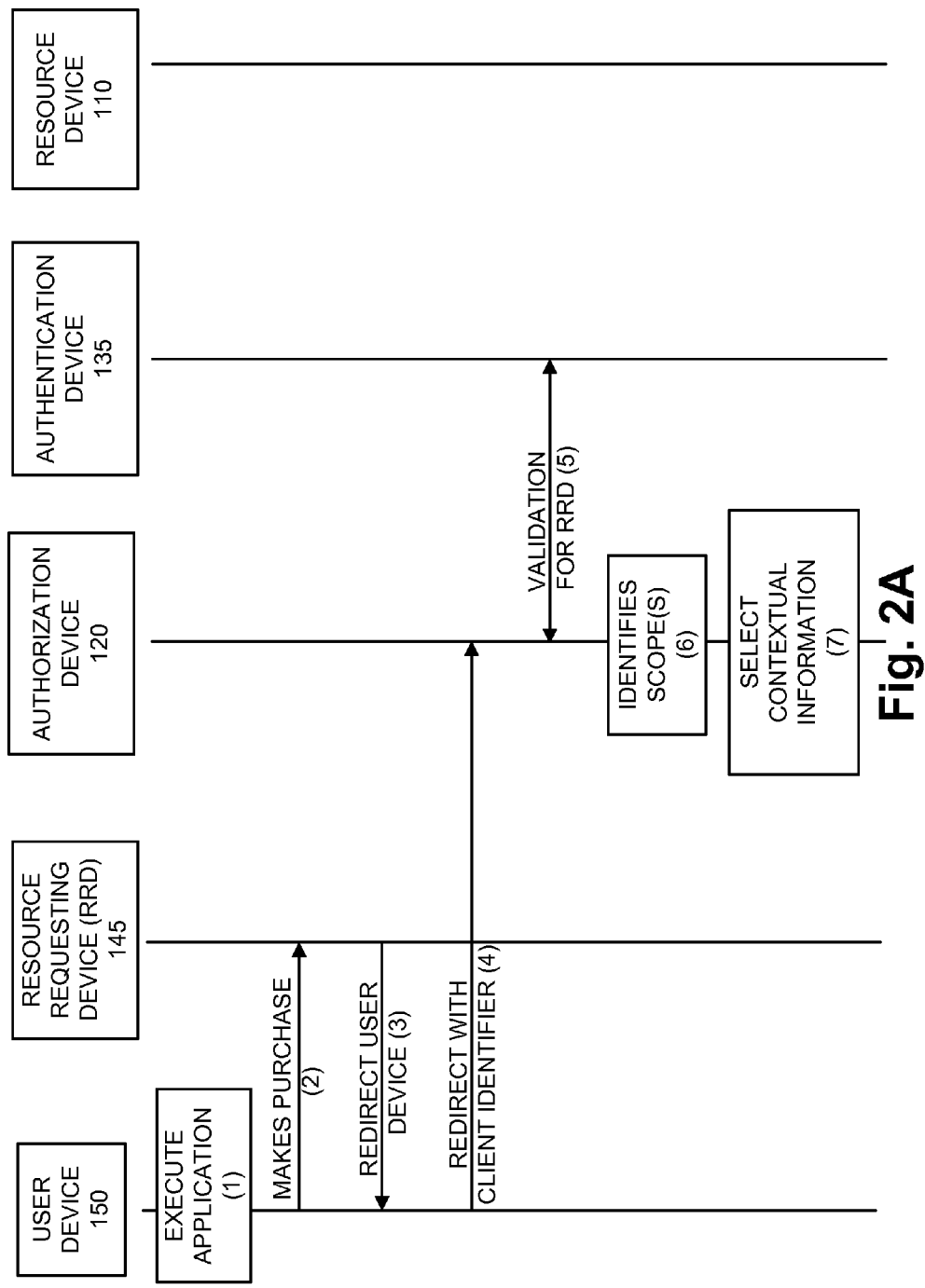

The following detailed description refers to the accompanying drawings. The same reference numbers in different drawings may identify the same or similar elements.

The current draft v2-31 of the OAuth 2.0 specification dated Jul. 31, 2012, which is a work in progress and incorporated herein by reference, supports various authorization grant mechanisms. The OAuth 2.0 specification defines four roles: resource owner, resource server, client, and authorization server. The resource owner is an entity capable of granting access to a protected resource. The resource server is the server hosting the protected resources and capable of accepting and responding to protected resource requests using access tokens. The client is an application making protected resource requests on behalf of the resource owner and with the resource owner's authorization. The authorization server is the server issuing access tokens to the client after successfully authenticating the resource owner and obtaining authorization.

A client that wants to obtain access to resources (e.g., data) having data attributes defined by a specific scope can send a request to an authorization server to obtain an authorization grant. According to the OAuth 2.0 specification, one of the supported authorization grants is based on an authorization code. An authorization server issues the authorization grant to a requesting client after authenticating the resource owner and obtaining authorization. Since the resource owner only authenticates with the authorization server, the resource owner's credentials are not shared with the client. Resources, in the above context, may be subscriber profile attributes, also called "scopes" in the OAuth 2.0 specification. Given the expansive nature of the current version of the OAuth 2.0 standard, this description does not intend to set forth an exhaustive treatment or review of the current version.

The current version of the OAuth 2.0 specification, however, does not specify, among other things, how to handle a scope that includes data attributes of differing levels of sensitivity (e.g., access levels). Rather, the OAuth 2.0 specification assumes that all scopes are of similar sensitivity. Additionally, the OAuth 2.0 specification requires explicit end-user consent for all requested scopes. However, the current version of the OAuth 2.0 specification fails to consider supporting different consent processes based on differing levels of sensitivity. Additionally, the current version of the OAuth 2.0 specification fails to consider contextual information.

According to an exemplary embodiment, an extended OAuth architecture supports multiple scopes of different sensitivities in a single request. According to an exemplary implementation, data attributes of a scope may be assigned a sensitivity level, such as public, private, or a combination thereof. According to other implementations, other types of categories or sensitivity levels may be applied to scopes. As an example of a scope with multiple sensitivities, a scope may include the following data attributes: mobile device type; billing address; prepaid or postpaid; and country of residence. Mobile device type and country of residence may be assigned a sensitivity level of public. However, billing address and prepaid or postpaid may be assigned a sensitivity level of private.

According to an exemplary embodiment, release of a resource that is assigned a sensitivity level of public does not require consent from the resource owner. Conversely, according to an exemplary embodiment, release of a resource that is assigned a sensitivity level of private requires consent from the resource owner.

According to an exemplary embodiment, the extended OAuth architecture selects a type of consent based on the sensitivity level of the resource. For example, the extended OAuth architecture selects a type of consent for a resource that is assigned a sensitivity level of private. Under a framework in which multiple sensitivity levels of private are implemented, the extended OAuth architecture selects a type of consent that corresponds to the sensitivity level. By way of example, the multiple sensitivity levels of private (e.g., low, medium, and high) may each have a corresponding type of consent. According to an exemplary embodiment, the extended OAuth architecture selects the highest sensitivity level as the type of consent when there are multiple sensitivity levels included in a scope. For example, if the scope of a request includes data attributes of a low sensitivity level and data attributes of a high sensitivity level, the extended OAuth architecture select the type of consent correlated with the high sensitivity level to obtain consent from the resource owner for the entire scope of the request (i.e., the data attributes of the low sensitivity level and the data attributes of the high sensitivity level).

According to an exemplary embodiment, the type of consent includes a mode of communication used to obtain consent or authorization from the resource owner for the release of a protected resource. According to an exemplary implementation, the type of consent may include one or multiple modes of consent. According to an exemplary implementation, the type of consent includes a Web-based communication, a text-based communication (e.g., a Short Messaging Service (SMS) communication, an e-mail communication, a Multimedia Messaging Service (MMS) communication), a telephonic-based or vocal-based communication (e.g., an interactive voice response (IVR) communication, etc.), or other graphical user interface communication. The type of consent may also indicate other information, such as, for example, whether authentication of the resource owner is to be performed. By way of example, a text-based communication may not require authentication of the resource owner. However, a Web-based communication may require authentication of the user.

According to an exemplary embodiment, the extended OAuth architecture selects a type of consent based on contextual information. According to an exemplary embodiment, the contextual information includes a client preference pertaining to a client that is requesting a resource. A client preference may indicate a preferred type of consent to be used. For example, a client that interacts with a resource owner over the telephone may indicate a client preference that the type of consent used to obtain consent from the resource owner is of a particular mode of communication. In this example, the client preference may indicate that the type of consent is obtained via the telephone (e.g., an interactive voice response (IVR) mechanism). According to an exemplary embodiment, the client provides an authorization device of the extended OAuth architecture a client identifier. The authorization device uses the client identifier to select the client preference pertaining to the client.

According to an exemplary embodiment, the contextual information includes information pertaining to the resource owner. For example, the contextual information includes information pertaining to user device capabilities associated with the resource owner, communication services subscribed to (e.g., short messaging service (SMS), mobile service, etc.), and/or resource owner preferences. The resource owner preferences may indicate consent preferences (e.g., type of consent) and/or security level preferences (e.g., high, medium, low, etc.) pertaining to the release of resource data. According to an exemplary embodiment, the authorization device obtains an identifier pertaining to the resource owner and/or user device to select the contextual information pertaining to the resource owner.

According to an exemplary embodiment, an authorization device of the extended OAuth architecture performs a selected type of consent. According to another exemplary embodiment, the authorization device uses a third party service to perform the selected type of consent. A selected type of consent may include one or multiple types of consents. For example, as previously described, the type of consent may correspond to receiving resource owner consent through the use of an SMS message. Alternatively, the type of consent may correspond to receiving resource owner consent through the use of verbal authorization (e.g., via a telephone call) or written authorization (e.g., via an Internet browser).

According to an exemplary embodiment, an authorization device generates an authorization code as an authorization grant to allow a client to obtain an access token and, in turn, obtain the resource data from a resource device.

According to an exemplary embodiment, when a scope includes a mixture of both private and public scopes, the authorization device seeks resource owner consent only for the private scopes. According to an exemplary embodiment, the authorization device identifies the sensitivity level(s) of a data attribute(s) present in a request.

While exemplary embodiments provided in this description may be implemented based on the use of a particular network architecture or platform, messaging scheme, etc., such implementations are not intended to be restrictive or provide an exhaustive treatment, as such. In other words, the embodiments described herein may be implemented using other suitable network architectures, messaging scheme, etc., which may not be specifically described.

FIG. 1 is a diagram illustrating an exemplary environment in which an exemplary embodiment of an extended OAuth service may be implemented. Referring to FIG. 1, an environment 100 includes a network 105. Network 105 includes a resource device 110, an authorization device 120, an authentication device 135, and a resource requesting device 145. Environment 100 also includes a user device 150.

The number of devices and the configuration in environment 100 are exemplary and provided for simplicity. According to other embodiments, environment 100 may include additional devices, fewer devices, different devices, and/or differently arranged devices, than those illustrated in FIG. 1. According to other embodiments, a single device in FIG. 1 may be implemented as multiple devices. Additionally, or alternatively, according to other embodiments, multiple devices may be implemented as a single device. For example, resource device 110 and authorization device 120 may be implemented as a single device. Additionally, or alternatively, environment 100 may include additional networks and/or differently arranged networks than those illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, proxy device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and involve intermediary device(s) and/or network(s) not illustrated in FIG. 1.

Network 105 includes one or multiple networks that provide(s) an extended OAuth service, as described herein. Network 105 may be implemented as a terrestrial-based network. For example, network 105 may be implemented as an Internet Protocol (IP) network, a private network, a public network, or other suitable network.

Resource device 110 includes a device that stores and/or hosts resources. For example, resource device 110 may be implemented as a resource server. The resources may include data of varying sensitivity levels. For example, resource data may be categorized as public resource data or private resource data. According to other implementations, resources may include data having a different nomenclature or categorization for designating a sensitivity level.

Authorization device 120 includes a device that authorizes access to resources according to the extended OAuth service, as described herein. For example, authorization device 120 may be implemented as an authorization server. In contrast to an authorization server of the current OAuth 2.0 specification, according to an exemplary embodiment, authorization device 120 provides an extended OAuth service that supports multiple scopes of varied sensitivities, as described herein. According to an exemplary implementation, scopes may be designated as public, private, or other designations that indicate whether authorization is to be sought from the resource owner. According to another implementation, scopes may be designated in a ternary system or a higher system in which varying levels of consent from the resource owner may be imposed. By way of example, for resource data having a low level sensitivity, no consent is required; for resource data having a medium level of sensitivity, any method of consent is acceptable; and for resource data having a high sensitivity level, only particular methods of consent are accepted. According to still other implementations, sensitivity schemes that include finer granularity levels may be used.

According to an exemplary embodiment, authorization device 120 may or may not obtain authorization from the resource owner, depending on the sensitivity level of the resource data. This is in contrast to the authorization server of the current OAuth 2.0 specification. According to an exemplary implementation, authorization device 120 obtains authorization from the resource owner when the sensitivity level of the resource data is designated as private or other designation. Conversely, according to an exemplary implementation, authorization device 120 may not obtain authorization from the resource owner when the sensitivity level of the resource data is designated as public or has another designation.

According to an exemplary embodiment, authorization device 120 selects a type of consent based on contextual information. This is in contrast to the authorization server of the current OAuth 2.0 specification. According to an exemplary embodiment, authorization device 120 stores a database or a data structure that stores information indicating types of consent, in which assignments of the types of consent are based on the sensitivity level(s) of data attributes included in scopes and contextual information. According to an exemplary embodiment, the contextual information pertains to resource requesting devices 145, as described herein. According to an exemplary embodiment, the contextual information pertains to resource owners, as described herein.

According to an exemplary embodiment, authorization device 120 generates an authorization code as an authorization grant, without seeking consent from the resource owner, when the sensitivity level of the resource data is below a threshold. For example, authorization device 120 generates a default authorization code when the sensitivity level of the resource data is public. Conversely, according to an exemplary embodiment, authorization device 120 generates an authorization code as an authorization grant, after obtaining consent from the resource owner, when the sensitivity level of the resource data is above a threshold. For example, authorization device 120 generates an authorization code when the sensitivity level is private and resource owner consent is obtained.

Authentication device 135 includes a device that authenticates resource requesting device 145. For example, authentication device 135 validates a client (e.g., resource requesting device 145).

Resource requesting device 145 includes a device that requests access or use of resources stored and/or hosted by resource device 110. For example, resource requesting device 145 may be implemented as a client.

User device 150 includes a device capable of communicating with network 105. For example, user device 150 may be implemented as a mobile device (e.g., a smartphone, a tablet device, a personal digital assistant (PDA), a personal communication system (PCS), etc.), a computer (e.g., a desktop computer, a laptop computer, a palmtop computer, a netbook), a television, a vehicular communication system, or other types of user devices capable of communicating with network 105.

Figure 3:
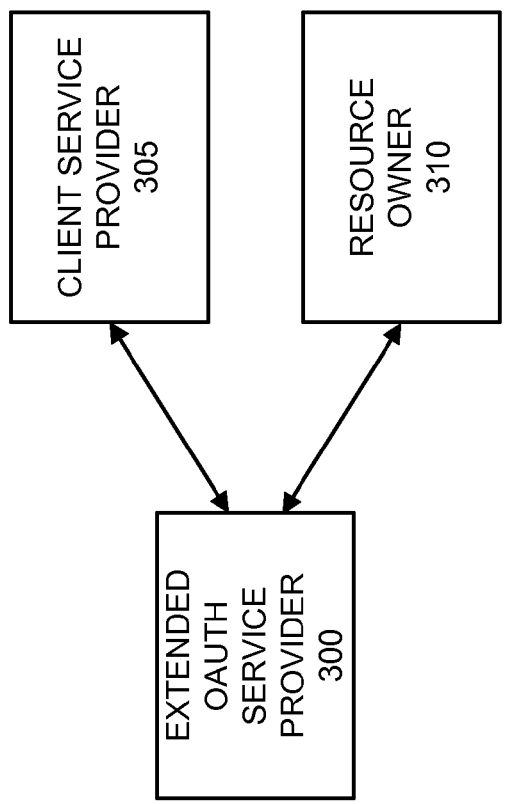
FIG. 3 is a diagram illustrating an exemplary environment for on-boarding with the extended OAuth service.

According to an exemplary embodiment, clients that use the extended OAuth service undergo an on-boarding process. Referring to FIG. 3, during the on-boarding process, a client service provider 305 provides the extended OAuth service provider 300 with a client preference pertaining to the type of consent to be used. For example, as previously described, the client preference may indicate a particular method, form, or mode of communication to be used to obtain consent or authorization from the resource owner. According to an exemplary embodiment, the extended OAuth service provider 300 may publish different types of consents that are available to clients. Client service provider 305 may select a type of consent. In this way, client service provider 305 may select a preferred type of consent that aligns with the application or the service provided by client service provider 305. By way of example, a client service provider 305 that interacts with a resource owner 310 via the Web may select a Web-based type of consent versus a telephone-based type of consent (e.g., a telephone call). By way of a further example, a client service provider 305 that interacts with a resource owner 310 via a television service may select a television-based consent (e.g., graphical user interfaces, etc.) versus a telephone-based type of consent. Similarly, a client service provider 305 that interacts with a resource owner 310 via a telephone service may select a telephone-based consent, and so forth and so on.

According to an exemplary embodiment, in response to receiving the client's preference, the extended OAuth service provider 300 issues a client identifier. An extended OAuth architecture stores the client preference and maps the preference to the issued client identifier. According to an exemplary embodiment, authorization device 120 stores contextual information, as previously described. The contextual information includes client preferences and client identifiers.

Referring to FIG. 1, during a communication between user device 150 and resource requesting device 145, authorization device 120 will obtain consent from the resource owner to release a resource (e.g., data) to resource requesting device 145. According to an exemplary embodiment, resource requesting device 145 redirects user device 150 to authorization device 120. For example, during a Web session with user device 150, resource requesting device 145 may initiate a Uniform Resource Locator (URL) redirect or forward to authorization device 120.

According to other embodiments, resource requesting device 145 may communicate with authorization device 120 to cause authorization device 120 to communicate with user device 150. For example, according to an exemplary scenario, assume that user device 150 and resource requesting device 145 are communicating over the telephone. During the communication, resource requesting device 145 desires the release of a resource. Resource requesting device 145 sends a message (e.g., a scope request) to authorization device 120. The request includes a client identifier. The request may include a telephone number, a user identifier, and/or a user device identifier. In response to receiving the request, authorization device 120 places a telephone call or causes a telephone call to be placed to user device 150. The resource owner of user device 150 has a call waiting service. Alternatively, authorization device 120 may place a telephone call or cause a telephone call to be placed to another telephone associated with the resource owner. For example, the resource owner may be communicating with resource requesting device 145 via a mobile telephone, and authorization device 120 places a telephone call or causes a telephone call to be placed to the resource owner's landline telephone so as to obtain consent.

According to another exemplary scenario, user device 150 and resource requesting device 145 may be communicating via a television service. For example, user device 150 may include a smart television or a television and a set top box. During the communication (e.g., via a graphical user interface, a widget, an overlay, etc.), resource requesting device 145 desires the release of a resource and sends a scope request to authorization device 120. Authorization device 120 may communicate with the user via the television service or some other mode of communication.

As described, whether the resource requesting device 145 redirects user device 150 or communicates with authorization device 120, resource requesting device 145 may need to identify the extended OAuth service provider to use for a resource owner. According to an exemplary embodiment, during the on-boarding process, clients may be provided with a means to identify the extended OAuth service provider. In some cases, the extended OAuth service provider may provide other services (e.g., mobile service, television service, Internet service, telephone service, etc.) to which a resource owner is subscribed. According to such cases, resource requesting device 145 may use, for example, a carrier proprietary application programming interface (API) that allows resource requesting device 145 to determine a service provider associated with the resource owner. By way of further example, the carrier proprietary API may allow resource requesting device 145 to determine a wireless carrier associated with a telephone number or mobile directory number (MDN) of the resource owner. Resource requesting device 145 may obtain the resource owner's telephone number or MDN from the resource owner. Resource requesting device 145 identifies the extended OAuth service provider based on a mapping between the wireless carrier and the extended OAuth service provider. According to other implementations, resource requesting device 145 may select an extended OAuth service provider based on other methods and/or information. By way of example, the resource owner may provide an extended OAuth identifier that identifies the extended OAuth service provider. Alternatively, a single sign-on service may include extended OAuth services, which allows resource requesting device 145 to select the extended OAuth service provider associated with the resource owner.

Resource requesting device 145 may include other API(s) that allow(s) resource requesting device 145 to obtain resources via the extended OAuth service. For example, resource requesting device 145 may include an API to communicate with resource device 110.

Figure 2C:
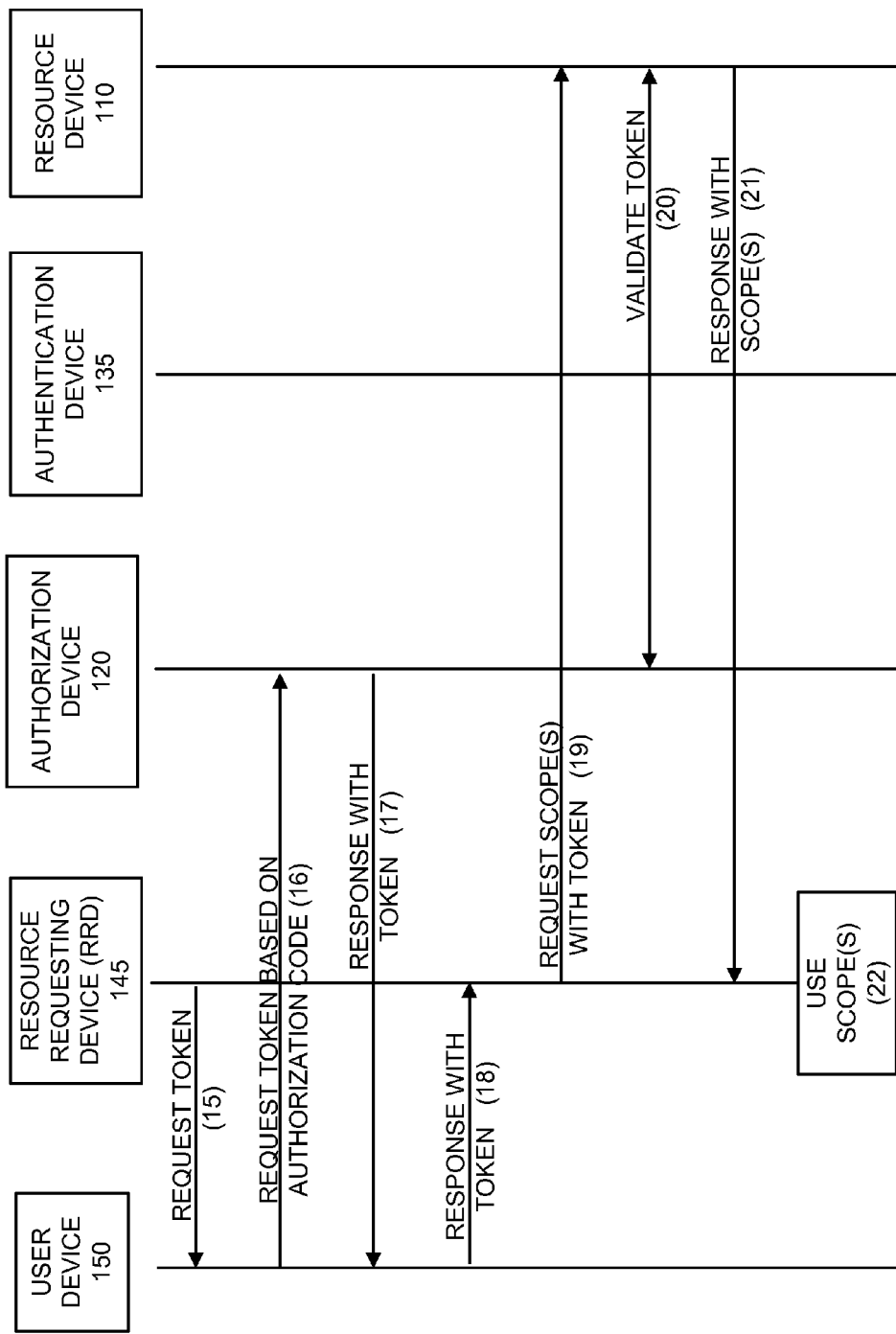

FIGS. 2A-2C are diagrams illustrating an exemplary process of an extended OAuth service based on an exemplary scenario in which a requested scope requires consent from the resource owner. Referring to FIG. 2A, step (1), assume that a user of user device 150 (e.g., a smartphone) executes an application (e.g., a Web browser). The user, via user device 150 and the Web browser, visits a web site hosted by resource requesting device 145. By way of example, assume resource requesting device 145 is an e-commerce site (e.g., Company X) that allows the user to make a purchase of an item, content, or some other type of asset. In step (2), the user, via user device 150 and the Web browser, decides to make a purchase. For example, the user decides to purchase several items from Company X and would like to create an account. According to this exemplary scenario, assume the user is a first-time visitor at resource requesting device 145. Also, assume resource requesting device 145 requires certain information from the user to complete the registration process to create the account.

In steps (3) and (4), based on the identification of the user's wireless provider, resource requesting device 145 redirects (e.g., an HTTP 302 redirect) user device 150 to authorization device 120. According to an exemplary implementation, the redirect uses a Uniform Resource Identifier (URI) that includes one or multiple name-value pairs (also known as key-value pair or attribute-value pair) or other type of string(s) (e.g., a string that includes a delimiter, etc.) that indicate(s) the type of requested resource data (e.g., data attribute, etc.) and a client identifier that identifies resource requesting device 145.

As a part of step (3) to generate the URI, resource requesting device 145 selects the resource data to be obtained. For example, according to this exemplary scenario, resource requesting device 145 identifies that the resource owner's/user's name and address, birth date, credit card information, and billing address is needed to complete the registration process. The URI associated with the redirect includes a string that indicates the requested resource data (e.g., the scope). Additionally, the URI also includes a client identifier that identifies resource requesting device 145. According to other implementations, resource requesting device 145 may provide the request for the resource data, the client identifier, or both in a separate message to authorization device 120.

In step (5), authorization device 120 validates resource requesting device 145 with authentication device 135. For example, authorization device 120 extracts the client identifier from the URI or the separate message and passes the client identifier to authentication device 135. Authentication device 135 verifies whether the client identifier is valid. According to this scenario, assume that the validation of resource requesting device 145 is successful. According to other scenarios, if resource requesting device 145 is not successfully validated, then the authorization process may be halted, error messages may be sent, and/or security measures may be taken.

In step (6), authorization device 120 identifies the scopes requested. For example, authorization device 120 extracts the attribute-value pairs or other type of formatted string from the URI. According to an exemplary implementation, authorization device 120 maps the scope included in the URI to a sensitivity level. For example, authorization device 120 stores or has access to a database or a data structure that allows authorization device 120 to correlate the scope to a sensitivity level, such as public or private.

According to this scenario, assume that authorization device 120 determines that the data attributes (e.g., name and address of the user) are public, and that the data attributes (e.g., credit card information, billing address, and birth date) are private based on using the database or the data structure.

In step (7), authorization device 120 selects contextual information. For example, authorization device 120 selects contextual information pertaining to resource requesting device 145 based on the client identifier. According to this exemplary scenario, assume that a client preference indicates to perform a Web-based type of consent. According to this exemplary scenario, assume that authorization device 120 does not use contextual information pertaining to the resource owner.

Referring to FIG. 2B, in step (8), authorization device 120 selects the type of consent based on the scopes and the contextual information (e.g., the client preference). According to this example, assume that the birth date, credit card information, and the billing address are assigned the same private sensitivity level. For example, authorization device 120 stores a database or a data structure that correlates the sensitivity level and the contextual information to a type of consent. According to this scenario, authorization device 120 selects the type of consent based on a correlation between the private sensitivity level and the client identifier.

According to other scenarios, authorization device 120 selects the type of consent based on contextual information pertaining to the resource owner. As previously described, the resource owner may provide contextual information to the extended OAuth service provider. The information indicating the type of consent to be used may be based on the contextual information of the resource owner. As an example, the resource owner may indicate particular user device capabilities, services subscribed to, or a combination of both. Additionally, or alternatively, a resource owner may select preferences (e.g., type of consent) and/or security level preferences pertaining to the release of protected resource data. According to such an embodiment, the type of consent stored in the database or the data structure is based on the resource owner's contextual information. In cases when the extended OAuth service provider is a service provider of other services (e.g., Internet, mobile, etc.) for the resource owner, subscriber profile information may be used to select and store the type of consent to be used.

According to an exemplary implementation, the extended OAuth service provider may afford contextual information pertaining to the resource owner priority over the client's contextual information (e.g., a client preference).

In step (9), authorization device 120 provides a login page to the user to sign into the extended OAuth service. The user provides login information via the login page, and in step (10), authorization device 120 validates the login information with authentication device 135. According to this scenario, assume that the user is successfully logged into the extended OAuth service.

In step (11), after a successful login by the user, authorization device 120 provides a consent page that indicates the private scopes that require consent from the user. For example, authorization device 120 provides a consent page that prompts the user to authorize the release of the user's credit card information and birth date. According to an exemplary implementation, authorization device 120 does not seek authorization from the user for the release of the public scopes (e.g., the user's name and address). According to this scenario, the user authorizes the release of the private scopes via the consent page.

In step (12), authorization device 120 generates an authorization code based on the determination that the requested scopes include private resource data. In step (13), authorization device 120 redirects user device 150 to resource requesting device 145 with the authorization code. In step (14), user device 150 redirects to resource requesting device 145 and resource requesting device 145 obtains the authorization code. Referring to FIG. 2C, in steps (15) and (16), resource requesting device 145 requests an access token based on the authorization code, from authorization device 120 via user device 150. According to this scenario, assume that the authorization code is valid and, in steps (17) and (18), authorization device 120 issues an access token to resource requesting device 145 via user device 150.

In step (19), resource requesting device 145 requests the scopes (e.g., private and public resource data) from resource device 110 based on the received access token. In step (20), resource device 110 validates the access token with authorization device 120. According to this scenario, assume that the access token is successfully validated. In step (21), resource requesting device 145 obtains the requested scopes from resource device 110. In step (22), resource requesting device 145 uses the requested scopes. For example, according to this scenario, resource requesting device 145 pre-populates a Web page with the requested, resource data. In this way, the registration process is facilitated on behalf of the user.

Figure 4:
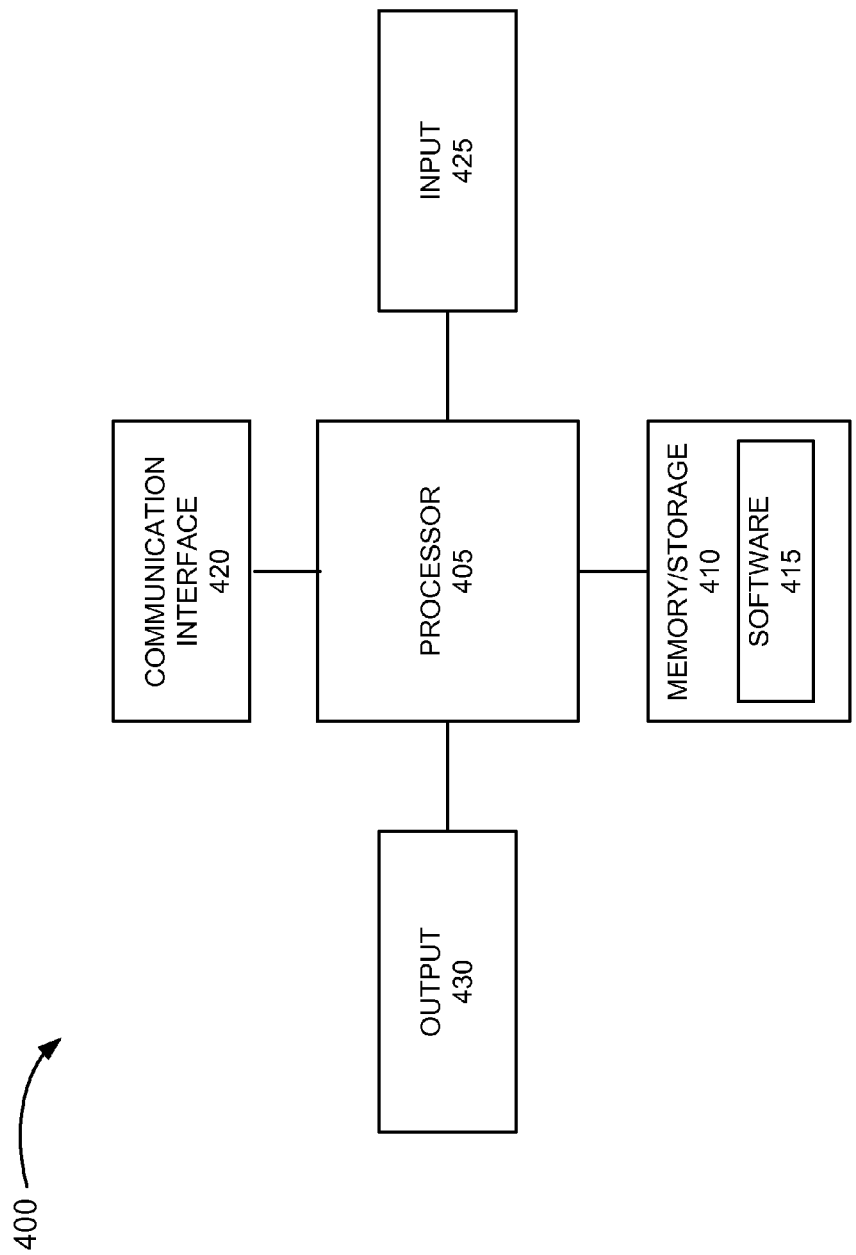
FIG. 4 is a diagram illustrating exemplary components of a device that may correspond to one or more of the devices previously depicted.

FIG. 4 is a diagram illustrating exemplary components of a device 400 that corresponds to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, authorization device 120 may be implemented with one or more program(s) and/or application(s). Additionally, for example, with reference to user device 150, one or more program(s) and/or application(s) may be used to display user interfaces, communicate with authorization device 120, etc. Additionally, for example, other devices (e.g., resource requesting device 145, etc.) may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or read into memory/storage 410 from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.) or the execution of software (e.g., processor 405 executing software 415).

Figure 5A:
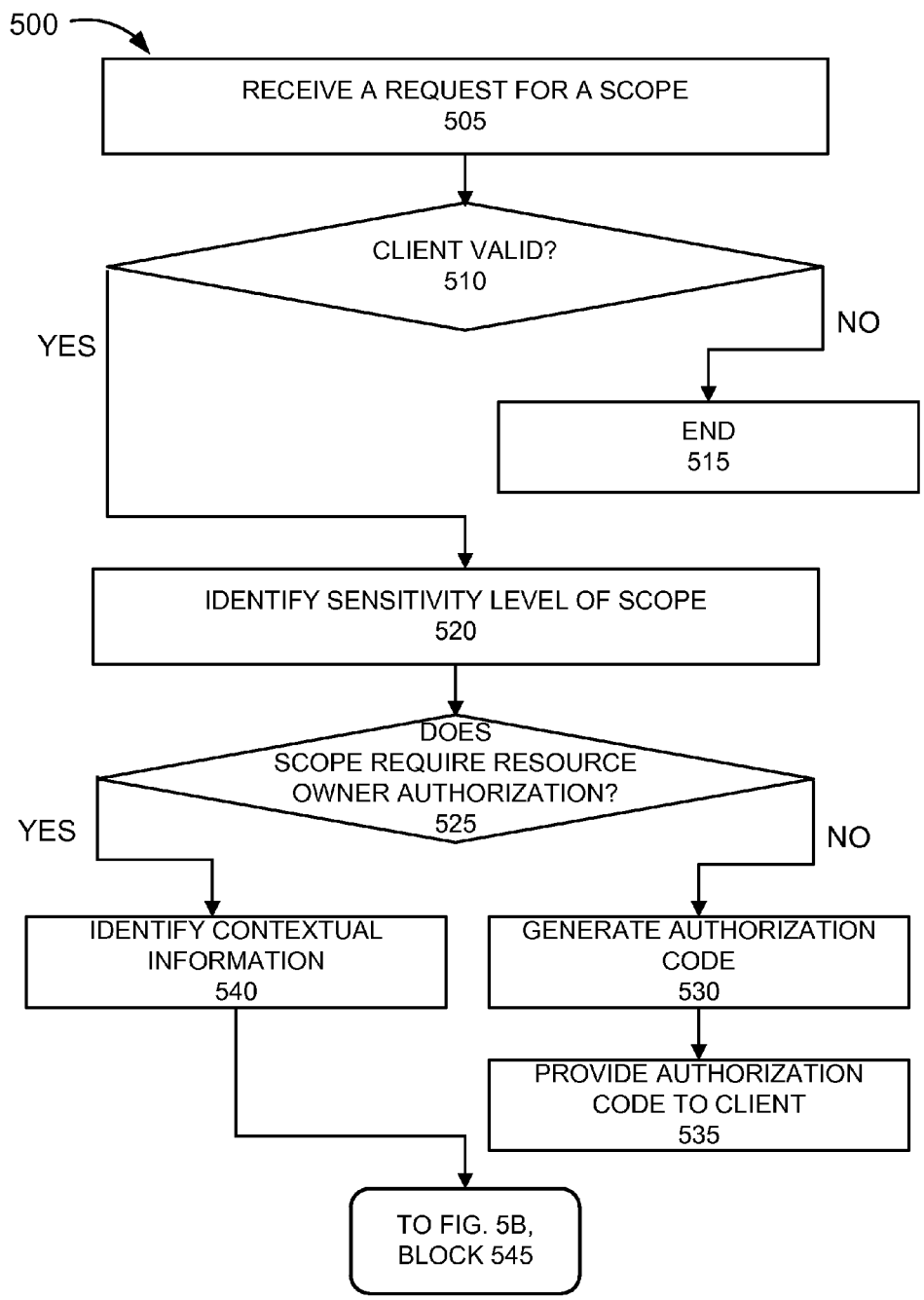
FIGS. 5A and 5B are flows diagram illustrating an exemplary process to select a type of consent based on a requested scope and contextual information.
Figure 5B:
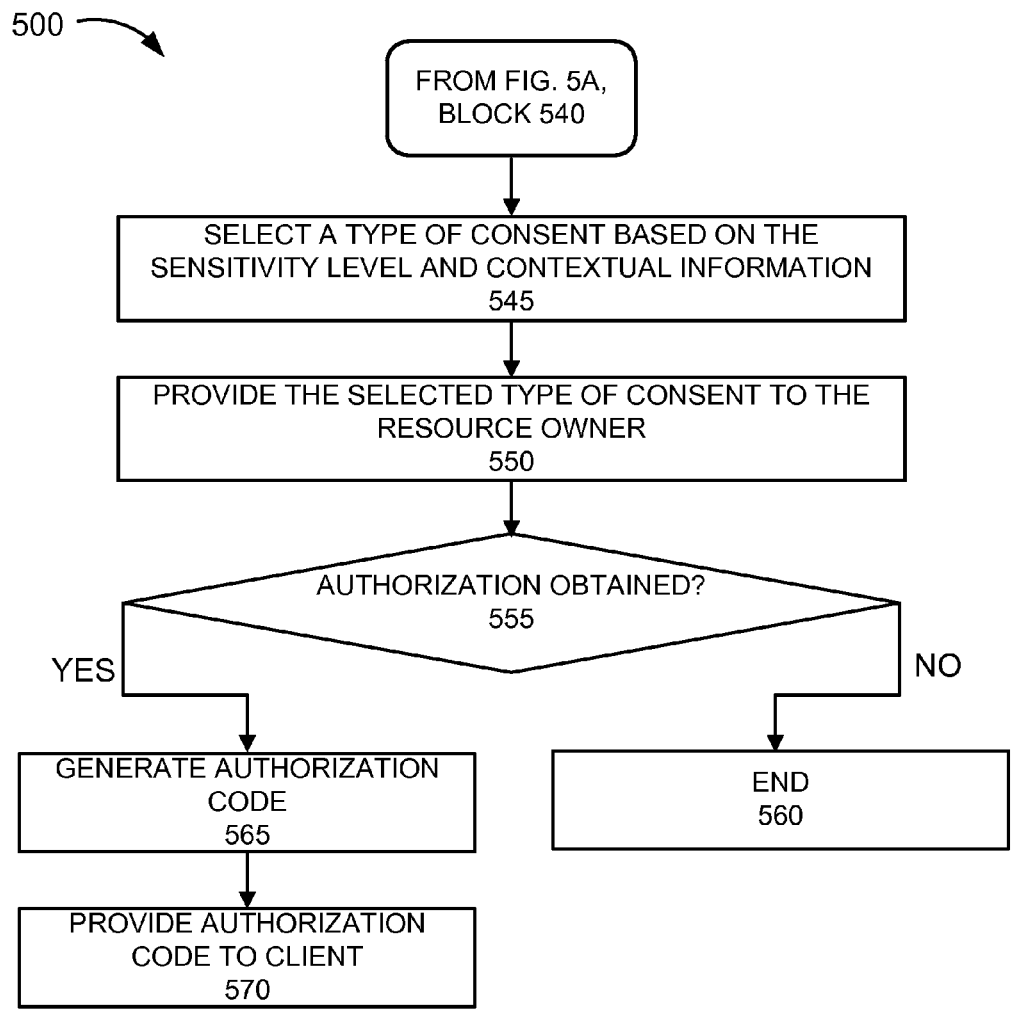

FIGS. 5A and 5B are flow diagrams illustrating an exemplary process 500 pertaining to the extended OAuth architecture. For example, FIGS. 5A and 5B illustrate an exemplary process for selecting a type of consent based on the scope and contextual information. A step or an act described in process 500 is performed by one of the devices illustrated in FIG. 1. For example, processor 405 of authorization device 135 may execute software 415 to perform the step or the act described.

Referring to FIG. 5A, block 505, process 500 begins with receiving a request for a scope. For example, authorization device 120 receives a redirect (e.g., an HTTP 302 redirect) from resource requesting device 145 via user device 150. According to an exemplary implementation, the redirect uses a URI that includes one or multiple name-value pairs or other type of string that indicates a scope. Additionally, for example, the URI includes a client identifier that identifies resource requesting device 145.

In block 510, it is determined whether the client is valid. For example, authorization device 120 extracts the client identifier from the URI. Authorization device 120 provides the client identifier to authentication device 135. Authentication device 135 authenticates resource requesting device 145 based on the client identifier.

If it is determined that the client is not valid (block 510—NO), then process 500 ends (block 515). For example, authorization device 120 generates and provides an error message indicating that the authentication failed. Authorization device 120 may initiate other security measures.

If it is determined that the client is valid (block 510—YES), then a sensitivity level of the scope is identified (block 520). For example, authorization device 120 extracts the one or multiple name-value pairs. Alternatively, another type of string that indicates the scope may be used. Authorization device 120 identifies the sensitivity level for each name-value pair. By way of example, authorization device 120 stores a database or a data structure that maps or correlates a data attribute (e.g., name, address, social security number, birth date, credit card information, etc.) to a sensitivity level (e.g. public, private, high, low, medium, etc.).

In block 525, it is determined whether the scope requires resource owner authorization. For example, authorization device 120 determines whether consent from the resource owner is required before an authorization grant is provided to the client based on the identified sensitivity level(s). By way of example, if resource data of the scope is assigned a sensitivity level of public, then consent from the resource owner is not needed for that resource data. Conversely, if resource data of the scope is assigned a sensitivity level of private, then consent from the resource owner is needed for that resource data.

If it is determined that the scope does not require authorization from the resource owner (block 525—NO), then an authorization code is generated (block 530). For example, authorization device 120 generates an authorization code that serves as an authorization grant.

In block 535, the authorization code is provided to the client. For example, authorization device 120 uses a redirect to provide the authorization code to resource requesting device 145 via user device 150. For example, the URI of the redirect includes the authorization code.

If it is determined that the scope does require authorization from the resource owner (block 525—YES), then contextual information is identified (block 540). For example, authorization device 120 selects contextual information based on the client identifier. Authorization device 120 may select contextual information pertaining to the resource owner. For example, authorization device 120 may obtain a resource owner identifier that allows authorization device 120 to select contextual information pertaining to the resource owner.

Referring to FIG. 5B, a type of consent based on the sensitivity level and contextual information is selected (block 545). For example, authorization device 120 uses the sensitivity level and the contextual information to select a type of consent. For example, authorization device 120 stores a database or a data structure that associates a type of consent with the sensitivity level and the contextual information.

In block 550, the selected type of consent is provided to the resource owner. For example, authorization device 120 requests, from the resource owner, consent for the release of resource data of the scope that is assigned a sensitivity level of private or other appropriate nomenclature. As an example, authorization device 120 provides a user interface to request consent from the resource owner. The user interface includes the resource data, the attributes of the resource data (e.g., billing address, etc.), or both. Alternatively, authorization device 120 may use other well-known methods to request consent from the resource owner. According to another implementation, a third party service may be used to obtain consent from the resource owner.

In block 555, it is determined whether authorization is obtained. For example, authorization device 120 determines, based on a response from the resource owner, whether consent from the resource owner is obtained. If authorization is not obtained (block 555—NO), then process 500 ends (block 550). For example, if the resource owner does not provide consent for the release of the private resource data, then authorization device 120 refuses this portion of the request.

If authorization is obtained (block 555—YES), then an authorization code is generated (block 565). For example, if the resource owner provides consent for the release of the private resource data, authorization device 120 generates an authorization code that serves as an authorization grant.

In block 570, the authorization code is provided to the client. For example, authorization device 120 uses a redirect to provide the authorization code to resource requesting device 145 via user device 150. For example, the URI of the redirect includes the authorization code.

Although FIGS. 5A and 5B illustrate an exemplary process 500 for authorizing a scope request, process 500 may include additional operations, fewer operations, and/or different operations than those illustrated in FIGS. 5A and 5B and described herein. For example, when a scope request pertains to both private resource data and public resource data, there are multiple possible outcomes. For example, the resource owner may refuse to consent to the release of all of the private resource data or a portion thereof. According to one implementation, if the resource owner fails to consent to the release of all of the private resource data, the extended OAuth service fails. For example, authorization device 120 provides a message to resource requesting device 145 that consent cannot be obtained. Alternatively, according to another implementation, the resource owner may consent to the release of only a portion of the private resource data. According to such an implementation, authorization device 120 generates an authorization code. As the process continues and resource requesting device 145 obtains the scope (e.g., private resource data) from resource device 110, resource requesting device 145 may pre-populate a page or perform some other usage with the private resource data. Resource requesting device 145 may determine whether to request the private data from the user (e.g., directly, end the session, continue with the session without the private data, or perform some other response given the circumstances.

The foregoing description of embodiments provides illustration, but is not intended to be exhaustive or to limit the embodiments to the precise form disclosed. Accordingly, modifications to the embodiments described herein may be possible. By way of example, the client may dynamically select a type of consent and communicate a preferred type of consent to authorization server 120 in a redirect or other suitable manner when the extended OAuth service is invoked. According to an exemplary implementation, the URI may include a string that identifies the selected type of consent. Authorization device 120 extracts the string from the URI and selects the type of consent based on the string.

Although examples of resource data, as described herein, have pertained to personal information associated with a resource owner (e.g., name, address, etc.), the embodiments described are not limited to this type of resource data. For example, a resource may be various forms of multimedia (e.g., pictures, videos, etc.) or any other form of data. Additionally, although examples of client preferences, as described herein, have been described that the type of consent corresponds to the mode of communication used between the resource owner and the resource requesting device, according to other embodiments, the type of consent may include using a mode of communication that is different from the mode of communication used between the resource owner and the resource requesting device.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:
1. A method comprising:
receiving, by a device, a request, from another device, to authorize a release of protected resource data, wherein the request includes a device identifier that identifies the other device and one or more indicators that indicate one or more attributes of the protected resource data being requested;
authenticating the other device based on the device identifier included in the request;
storing a first mapping between indicators and sensitivity levels, wherein the sensitivity levels include a private sensitivity level and a public sensitivity level, wherein the private sensitivity level indicates that consent from a resource owner is to be obtained for release of an instance of protected resource data assigned the private sensitivity level, and the public sensitivity level indicates that consent from the resource owner is not to be obtained for release of an instance of protected resource data assigned the public sensitivity level;
identifying, by the device, a sensitivity level for each indicator in response to a successful
authentication of the other device;
determining, by the device, whether or not the one or more indicators require consent from the resource owner of the protected resource data based on the identifying;
identifying, by the device, based on the device identifier, contextual information that indicates a preferred type of consent to be used to obtain consent from the resource owner, in response to determining that at least one of the one or more indicators requires consent from the resource owner, wherein the preferred type of consent is a preference setting requested by the other device;

selecting, by the device, a type of consent to be used to obtain consent from the resource owner based on the contextual information and one or more sensitivity levels corresponding to the one or more indicators;

requesting to a user device associated with the resource owner, consent from the resource owner according to the type of consent, based on the selecting;

generating, by the device, an authorization code in response to receiving consent from the resource owner; and transmitting, by the device and to the other device, the authorization code.

2. The method of claim 1, further comprising:

generating, by the device, an authorization code, without receiving consent from the resource owner, in response to determining that none of the one or more indicators require consent from the resource owner, and wherein the preferred type of consent indicates a mode of communication to be used to obtain consent from the resource owner.

3. The method of claim 1, wherein the receiving comprises:

receiving a redirect that includes a uniform resource identifier that includes the device identifier and the one or more indicators.

4. The method of claim 1, further comprising:

storing a second mapping between client identifiers and contextual information;

identifying the one or more sensitivity levels corresponding to the one or more indicators included in the request based on the first mapping; and identifying the contextual information pertaining to the other device based on the second mapping.

5. The method of claim 1, further comprising:

receiving a response from the resource owner; and determining whether the response indicates that the resource owner consents.

6. The method of claim 1, further comprising:

providing a user interface that includes the at least one of the one or more indicators that require consent; and obtaining consent from the resource owner via the user interface.

7. The method of claim 1, wherein the transmitting comprises:

transmitting a redirect that includes a uniform resource identifier that includes the authorization code, and wherein the selecting comprises:

identifying contextual information pertaining to the resource owner; and selecting the type of consent based on the contextual information pertaining to the resource owner.

8. The method of claim 1, wherein the one or more indicators include one or more name-value pairs that indicate one or more data attributes of the one or more attributes of the protected resource data.

9. A device comprising:

a communication interface;

a memory that stores instructions; and a processor to execute the instructions to:

receive, via the communication interface and from another device, a request to authorize a release of protected resource data, wherein the request includes a device identifier that identifies the other device and one or more indicators that indicate one or more attributes of the protected resource data being requested;

authenticate the other device based on the device identifier included in the request;

store a first mapping between indicators and sensitivity levels, wherein the sensitivity levels include a private sensitivity level and a public sensitivity level, wherein the private sensitivity level indicates that consent from a resource owner is to be obtained for release of an instance of protected resource data assigned the private sensitivity level, and the public sensitivity level indicates that consent from the resource owner is not to be obtained for release of an instance of protected resource data assigned the public sensitivity level;

identify a sensitivity level for each indicator in response to a successful authentication of the other device;

determine whether or not the one or more indicators require consent from the resource owner of the protected resource data based on the identification of the sensitivity level of each indicator;

identify, based on the device identifier, contextual information that indicates a preferred type of consent to be used to obtain consent from the resource owner in response to a determination that at least one of the one or more indicators requires consent from the resource owner, wherein the preferred type of consent is a preference setting requested by the other device;

select a type of consent to be used to obtain consent from the resource owner based on the contextual information and one or more sensitivity levels corresponding to the one or more indicators;

request, via the communication interface and to a user device associated with the resource owner, consent from the resource owner according to the type of consent;

generate an authorization code in response to a receipt of consent from the resource owner; and transmit, via the communication interface and to the other device, the authorization code.

10. The device of claim 9, wherein the processor to execute the instructions to:

generate an authorization code, without receiving consent from the resource owner, in response to a determination that none of the one or more indicators require consent from the resource owner, and wherein the preferred type of consent indicates a mode of communication including at least one of text messaging, voice messaging, or a graphical user interface to be used to obtain consent from the resource owner.

11. The device of claim 9, wherein when receiving, the processor to execute the instructions to:

receive, via the communication interface, a redirect that includes a uniform resource identifier that includes the device identifier and the one or more indicators; and extract the device identifier and the one or more indicators from the uniform resource identifier.

12. The device of claim 9, wherein the processor to execute the instructions to:

store a second mapping between client identifiers and contextual information;

identify the one or more sensitivity levels corresponding to the one or more indicators included in the request based on the first mapping; and identify the contextual information pertaining to the other device based on the second mapping.

13. The device of claim 9, wherein the processor to execute the instructions to:
    receive, via the communication interface and from the user device, a response from the resource owner; and
    determine whether the response indicates that the resource owner consents.

14. The device of claim 9, wherein when selecting the type of consent, the processor to execute the instructions to:
    identify contextual information pertaining to the resource owner; and
    select the type of consent based on the contextual information pertaining to the resource owner.

15. The device of claim 9, wherein the processor to execute the instructions to:
    provide, via the communication interface, a user interface that includes the at least one of the one or more indicators that require consent; and
    obtain consent from the resource owner via the user interface.

16. The device of claim 9, wherein the device comprises an authorization server, and the device further comprises:
    a memory that stores a database or a data structure that stores a mapping between client identifiers and contextual information that indicates preferred types of consent.

17. A non-transitory storage medium storing instructions executable by a device, wherein the instructions comprise instructions to:
    receive a request to authorize a release of protected resource data, wherein the request
includes a device identifier that identifies a requesting device of the request and one or more
indicators that indicate one or more attributes of the protected resource data being requested;
    store a mapping between indicators and sensitivity levels, wherein the sensitivity levels include a private sensitivity level and a public sensitivity level, wherein the private sensitivity level indicates that consent from a resource owner is to be obtained for release of an instance of protected resource data assigned the private sensitivity level, and the public sensitivity level indicates that consent from the resource owner is not to be obtained for release of an instance of protected resource data assigned the public sensitivity level;
    identify a sensitivity level for each indicator of the protected resource data;
    identify, based on the device identifier, contextual information that indicates a preferred
type of consent to be used to obtain consent from a resource owner in response to a determination that at least one of the one or more indicators requires consent from the resource owner of the protected resource data, wherein the preferred type of consent is a preference setting requested by the requesting device;
    select a type of consent to be used to obtain consent from the resource owner based on the contextual information and one or more sensitivity levels corresponding to the one or more indicators; and
    transmit a request, to a user device associated with the resource owner, for consent from
the resource owner according to the type of consent.

18. The non-transitory storage medium of claim 17, wherein the instructions comprise instructions to:
    generate an authorization code in response to receiving consent from the resource owner; and
    generate an authorization code, without receiving consent from the resource owner, in response to a determination that none of the one or more indicators require consent from the resource owner, and wherein the preferred type of consent includes information indicating a mode of communication to be used to obtain consent from the resource owner.

19. The non-transitory storage medium of claim 17, wherein the instructions to select comprise instructions to:
    identify the one or more sensitivity levels corresponding to the one or more indicators
    included in the request based on the mapping.

20. The non-transitory storage medium of claim 19, wherein the instructions comprise instructions to:
    receive a response from the resource owner; and determine whether the response indicates that the resource owner consents.

* * * * *